R. COMMINGS.
Clod-Crusher.
No. 5,376.  Patented Nov. 20, 1847.
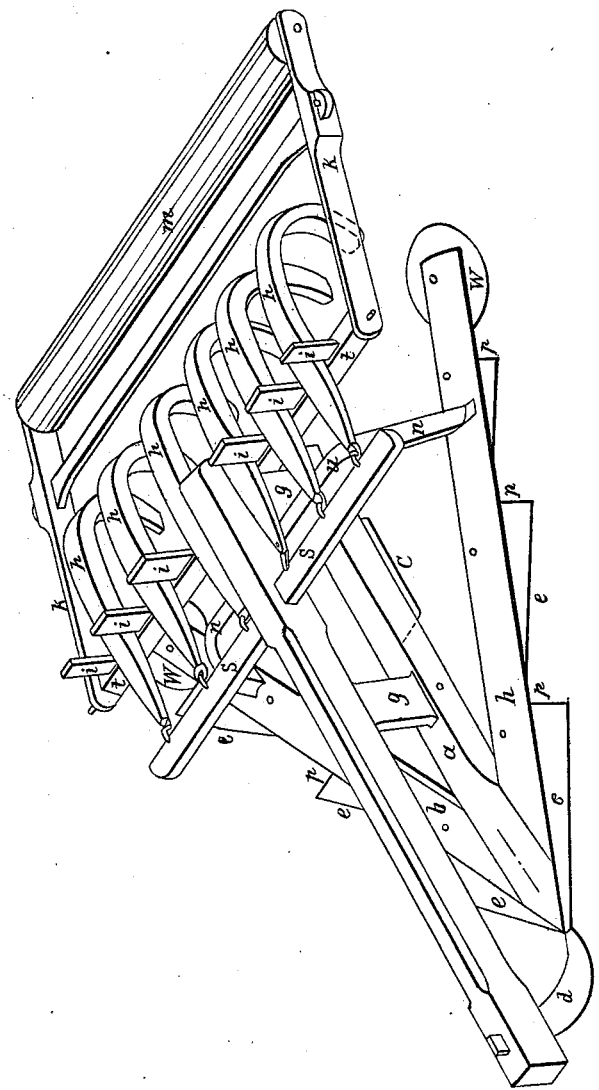

UNITED STATES PATENT OFFICE.

ROBERT COMMINGS, OF LIMA, INDIANA.

IMPROVEMENT IN BOG-CUTTERS.

Specification forming part of Letters Patent No. 5,376, dated November 20, 1847.

*To all whom it may concern:*

Be it known that I, ROBERT COMMINGS, of Lima, in the county of La Grange and State of Indiana, have invented a new and useful Improvement in Bog-Cutting Machines for Cutting Bogs upon Marshes and Low Grounds, (and all other grounds where such a machine may be used, commonly called the "Bog-Cutter;" and I do hereby declare that the following is a full and exact description thereof, reference being had to the annexed drawing, making part of this specification, and which is a perspective view of the machine.

It consists of a bed-piece, $a$, made of wood, and of any size that may be convenient, sloped and brought to a point in front. The posts $g$ $g$, for supporting the frame, are mortised and tenoned into the aforesaid bed. The side pieces, $b\ b$, are attached to the bed $a$ at the forward extremity, and incline outward from the bed-piece at an angle of about thirty degrees in the form of a harrow. They are strengthened and kept in their places by the iron cross-piece $n$, which is made in the form of an arch, in order that the bogs may pass under it, the side pieces, $b\ b$, to be made of iron, steel, or wood, as may be to the best advantage. To the side pieces aforesaid are attached the knives $e\ e$, &c. These are thin metallic plates, triangular shaped, and slanting out from the side pieces at an angle of about fifteen degrees, and brought to a feather-edge and fastened to said side pieces in any way that may be most convenient. They are made short in order that the grass may not accumulate upon them and clog the edge, as it will do upon long knives.

There are revolving knives $w\ w$ at the extremities of the side pieces, $b\ b$, and are so made that by their turning the grass may be prevented from accumulating upon them. Similar revolving knives may also be substituted in the place of the other knives when they can be used to advantage. Where there is no grass to obstruct the knives may be made of any convenient length. The grass, as it passes off the knives, will pass under the side pieces, $b\ b$, at the points $p\ p$, &c., where spaces are left for that purpose. The part marked $d$ is a piece of iron or steel, brought to a feather-edge and acting as a colter, extending from the beam $f$ to the bed-piece $a$, and securely attached thereto. It extends also some three inches below the machine, and, in conjunction with the metallic plate $c$, (which is about eighteen inches in length and four in breadth, being brought to a feather-edge and fastened securely to the under side of the bed-piece $a$,) prevents the machine from being moved from side to side as the knives strike the bogs. The hooks $h\ h$, &c., are attached to the cross-piece $s$ by hinges or any other suitable fastenings. These are made of wood, iron, or steel, as may be to the best advantage, and are brought at the lower extremity to a feather-edge. They extend across and rest upon the cross bar $t$. From the bar $t$ they curve downward until they reach as low as the knives. The bogs, as they are cut, will pass over the side pieces, $b\ b$, aforesaid, and be left in nearly the same position in which they were at first found. As the machine passes along they will be caught by the hooks $h\ h$, &c., and turned over so as to lie with the grass side down, there being sufficient interval between the bogs to permit them to turn over without interfering. The said hooks are so constructed as to rise up freely with the bog as it turns over by means of the hinges by which it is attached to the cross-piece $s$.

The advantages of turning over the bogs are that the grass upon them is thereby killed, (as when they are not thus turned over the grass upon them still continues to grow,) and also that the ground is much easier rendered smooth, which advantages are not secured by any other machine.

The upright pieces $i\ i$, &c., are mortised and tenoned into the cross-bar $t$ between the hooks, and extend to such a height that the said hooks cannot by any means be thrown over them.

The shafts $k\ k$, the brace $l$, and the roller $m$, for crushing the bogs and rendering the surface of the ground smooth, may be arranged after the usual and most approved way.

What I claim as my invention and improvement, and desire to secure by Letters Patent, is—

1. The combination of the angular knives $e$ $e$, &c., and revolving knives $w\ w$, in the manner described.

2. The hooks $h\ h$, &c., constructed and operating as described.

3. The combination of the roller $m$ with the hooks and knives.

ROBERT COMMINGS.

Witnesses:
N. TAYLOR,
JOHN HUME.